United States Patent
Murase et al.

(10) Patent No.: US 10,654,629 B2
(45) Date of Patent: May 19, 2020

(54) CHECK VALVE STRUCTURE, NOZZLE MEMBER USING SAME, AND SQUEEZE CONTAINER

(71) Applicants: TAKEUCHI PRESS INDUSTRIES CO., LTD., Toyama (JP); SENJU PHARMACEUTICAL CO., LTD., Osaka (JP)

(72) Inventors: Takahiro Murase, Toyama (JP); Tadashi Otsuka, Hyogo (JP)

(73) Assignees: TAKEUCHI PRESS INDUSTRIES CO., LTD., Toyama (JP); SENJU PHARMACEUTICAL CO., LTD., Osaka (JP)

( * ) Notice: Subject to any disclaimer, the term of this patent is extended or adjusted under 35 U.S.C. 154(b) by 0 days.

(21) Appl. No.: 15/777,453

(22) PCT Filed: Nov. 11, 2016

(86) PCT No.: PCT/JP2016/083585
§ 371 (c)(1),
(2) Date: May 18, 2018

(87) PCT Pub. No.: WO2017/086255
PCT Pub. Date: May 26, 2017

(65) Prior Publication Data
US 2018/0251273 A1 Sep. 6, 2018

(30) Foreign Application Priority Data
Nov. 20, 2015 (JP) .................................. 2015-227601

(51) Int. Cl.
*B65D 47/20* (2006.01)
*B65D 25/42* (2006.01)
(Continued)

(52) U.S. Cl.
CPC ............. *B65D 47/20* (2013.01); *B65D 25/42* (2013.01); *B65D 47/18* (2013.01);
(Continued)

(58) Field of Classification Search
CPC ........ B65D 47/20; B65D 49/02; B65D 25/42; B65D 47/18; B65D 83/00; F16K 15/14
See application file for complete search history.

(56) References Cited

U.S. PATENT DOCUMENTS 4,556,086 A    12/1985   Raines
4,739,906 A *   4/1988   LoTurco ............... A61J 1/1443
                                                 222/212
(Continued)

FOREIGN PATENT DOCUMENTS

CN      107922089 A    4/2018
JP      2003-028328 A    1/2003
(Continued)

OTHER PUBLICATIONS

International Search Report issued in corresponding International Application No. PCT/JP2016/083585, dated Feb. 7, 2017.
(Continued)

*Primary Examiner* — Donnell A Long
(74) *Attorney, Agent, or Firm* — McDermott Will & Emery LLP

(57) ABSTRACT

There are provided a check valve structure that not only prevents backflow of fluid but does not discharge fluid for unintended pressure in a correct direction, and a squeeze container using the check valve structure. A squeeze container includes a container and a nozzle member attached to an opening of the container. The nozzle member is provided with a check valve structure that is closed in an unloaded state, and that blocks a flow of fluid from downstream and allows a flow of fluid from upstream. The check valve (Continued)

structure is opened when an elastic valve element elastically deforms in two stages due to pressure of fluid from upstream (container).

17 Claims, 7 Drawing Sheets

(51) Int. Cl.
    *B65D 47/18*     (2006.01)
    *F16K 15/14*     (2006.01)
    *B65D 49/02*     (2006.01)
    *B65D 83/00*     (2006.01)

(52) U.S. Cl.
    CPC ......... *B65D 47/2056* (2013.01); *B65D 49/02* (2013.01); *B65D 83/00* (2013.01); *F16K 15/14* (2013.01)

(56) References Cited

U.S. PATENT DOCUMENTS

| | | | | |
|---|---|---|---|---|
| 5,836,484 | A * | 11/1998 | Gerber | B65D 47/205 222/494 |
| 6,616,012 | B2 * | 9/2003 | Dark | B65D 47/2081 222/1 |
| 2004/0134940 | A1 * | 7/2004 | Hearld | B65D 47/0828 222/481.5 |
| 2006/0261097 | A1 * | 11/2006 | Bailey | B65D 47/06 222/494 |
| 2011/0068133 | A1 * | 3/2011 | Painchaud | B65D 47/18 222/494 |
| 2011/0290752 | A1 * | 12/2011 | Yeager | A61F 9/0008 215/3 |
| 2015/0353245 | A1 * | 12/2015 | Sakimura | B65D 47/20 222/545 |
| 2018/0251274 | A1 * | 9/2018 | Hashimoto | B65D 41/04 |

FOREIGN PATENT DOCUMENTS

| | | |
|---|---|---|
| JP | 2004-225812 A | 8/2004 |
| JP | 2004-291968 A | 10/2004 |
| JP | 2007-119040 A | 5/2007 |
| JP | 2011-515290 A | 5/2011 |

OTHER PUBLICATIONS

Chinese Office Action issued in corresponding Chinese Patent Application No. 201680067745.7, dated Apr. 24, 2019, with English Translation.

Extended European Search Report issued in corresponding European Patent Application No. 168662575, dated Jul. 2, 2019.

Official Action issued in corresponding Russian Application No. 2018122250, dated Jan. 15, 2020, with English language translation.

Supplemental Communication issued in corresponding Russian Application No. 2018122250, dated Feb. 7, 2020, with English language translation.

* cited by examiner

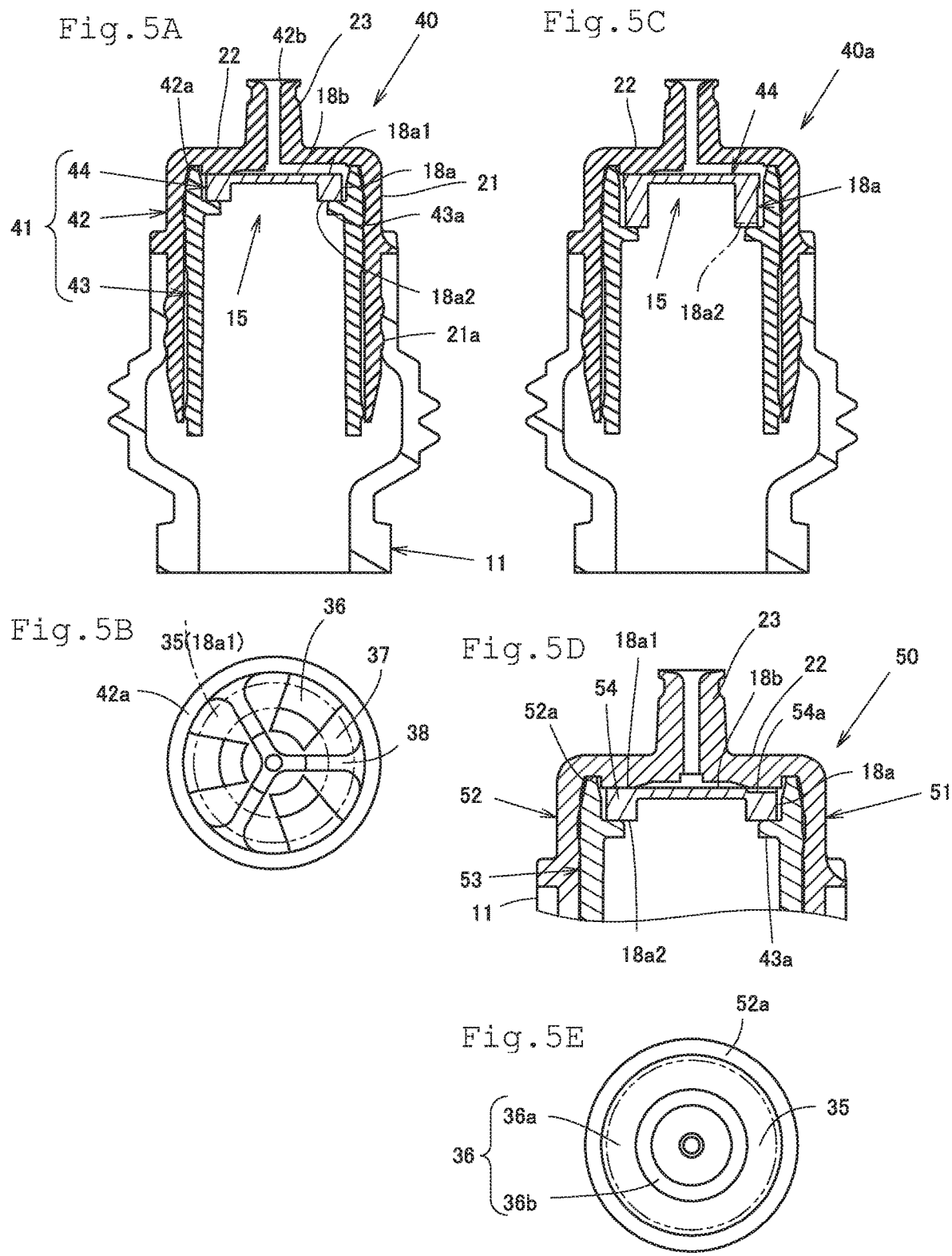

CHECK VALVE STRUCTURE, NOZZLE MEMBER USING SAME, AND SQUEEZE CONTAINER

CROSS REFERENCE TO RELATED APPLICATIONS

This application is the U.S. National Phase under 35 U.S.C. § 371 of International Application No. PCT/JP2016/083585, filed on Nov. 11, 2016, which claims the benefit of Japanese Application No. 2015-227601, filed on Nov. 20, 2015, the entire contents are hereby incorporated by reference.

TECHNICAL FIELD

The present invention relates to a check valve structure, a nozzle member and a squeeze container, using the check valve structure.

BACKGROUND ART

There is known a droplet container that contains a liquid medicine such as eye drops and drips a drop thereof. Such a droplet container is generally provided with a check valve for preventing a backflow of a liquid medicine in view of hygiene.

Patent Literatures 1, 2, and 3 each disclose a check valve structure including a valve seat, a support, and a flat plate-shaped valve element supported therebetween. Each valve element is supported such that its center projects downstream (outside a container) from upstream (inside the container). Thus, when receiving pressure from upstream toward downstream, the valve element deforms such that its center projects further, and then fluid flows around the valve element. Meanwhile, when receiving pressure from downstream toward upstream, the valve element deforms so as to return to a flat state to close a passage.

Patent Literatures 4 and 5 each disclose a check valve structure including a valve element having a notch formed at its center. Thus, the notch at the center of the valve element opens when receiving pressure from upstream toward downstream, and closes when receiving reverse pressure. Patent Literature 5 also describes an effect of drawing back remaining liquid in a nozzle caused by returning of the valve element to the original shape.

CITATIONS LIST

Patent Literatures

Patent Literature 1: JP 2011-515290 T
Patent Literature 2: JP 2004-225812 A
Patent Literature 3: U.S. Pat. No. 4,556,086
Patent Literature 4: JP 2004-291968 A
Patent Literature 5: JP 2007-119040 A

SUMMARY OF INVENTION

Technical Problems

Each check valve structure above is configured such that the valve element opens easily for pressure in a correct direction. Thus, when pressure in the correct direction is suddenly applied, fluid is discharged. When a flow rate in a container (e.g., a squeeze container) is adjusted depending on individual operation, individual differences increase.

It is an object of the present invention to provide a check valve structure that not only prevents backflow of fluid but does not discharge fluid for unintended pressure in a correct direction, and a squeeze container using the check valve structure.

Solutions to Problems

A check valve structure of the present invention includes an annular valve seat disposed upstream, an annular support portion disposed downstream, and an elastic valve element fixed between the valve seat and the support portion, wherein the elastic valve element has an annular outer edge portion and an inner portion surrounded by the outer edge portion, a passage between the valve seat and the support portion is closed by elastically bringing the valve seat into contact with the outer edge portion of the elastic valve element annularly, a closed state of the passage is maintained by pressure of fluid from the downstream, the inner portion of the elastic valve element deforms downstream by pressure of the fluid from the upstream, and the outer edge portion of the elastic valve element elastically deforms due to further pressure of the fluid from upstream to cause the contact between the valve seat and the outer edge portion of the elastic valve element to be partly released to open the passage.

In the check valve structure of the present invention, it is preferable that the outer edge portion of the elastic valve element is fixed by being held between an annular upstream support portion of the valve seat supporting an upstream end surface of the outer edge portion while being in contact with the upstream end surface, and an annular downstream support portion of the support portion supporting a downstream end surface of the outer edge portion while being in contact with the downstream end surface, the passage is closed by annular contact between the upstream support portion of the valve seat and the upstream end surface of the outer edge portion of the elastic valve element, and the upstream end surface of the annular outer edge portion of the elastic valve element, or the annular downstream support portion of the support portion is provided with a communication passage that communicates through the upstream end surface or the downstream support portion.

As described above, it is preferable that the elastic valve element is held between the valve seat and the support portion, and a recessed portion constituting the communication passage is formed in the downstream support portion. However, a notch constituting the communication passage may be formed in the downstream end surface of the elastic valve element. In this case, it is preferable that a plurality of communication passages, such as recessed portions or notches, are annularly provided at regular intervals.

It is preferable that the elastic valve element is held between the valve seat and the support portion, and the upstream support portion of the valve seat is an upper end opening of the valve seat.

It is preferable that the elastic valve element is held between the valve seat and the support portion, and at least a part of the outer edge portion is thicker than the inner portion.

It is preferable that the elastic valve element is held between the valve seat and the support portion, at least a part of the outer edge portion of the elastic valve element is thicker than the inner portion, and the upstream support portion is an annular inner flange formed on an inner surface of the valve seat.

It is preferable that the elastic valve element is held between the valve seat and the support portion, and an outer peripheral end of the outer edge portion is held.

In the check valve structure of the present invention, it is preferable that the outer edge portion of the elastic valve element is a cylindrical body, the upstream support portion of the valve seat includes a flange portion extending from the inner surface of the valve seat, and an inner cylindrical portion extending downstream from the flange portion, and one of the inner cylindrical portion and the outer edge portion is inserted into the other of the inner cylindrical portion and the outer edge portion, and an inner surface of the other and an outer surface of the one are fitted with each other to fix the elastic valve element, and the inner surface of the other and the outer surface of the one are brought into annular contact with each other to close the passage.

As described above, it is preferable that the elastic valve element is fixed by being fitted with the valve seat, the inner cylindrical portion is inserted into the outer edge portion, a clearance is provided between an upstream surface of the inner portion of the elastic valve element and (a downstream end of) the inner cylindrical portion of the valve seat, and a clearance is provided between the upstream end surface of the outer edge portion of the elastic valve element and an upper surface (a downstream surface) of the flange portion of the valve seat.

In the check valve structure of the present invention, it is preferable that at least a part of the inner portion is thin. In this case, it is preferable that the inner portion is curved so as to project upstream.

A nozzle member of the present invention is attached to an opening of a flexible container, and includes the check valve structure according to any one of aspects of the present invention, and a nozzle provided downstream of the support portion of the check valve structure.

In the nozzle member as described above, it is preferable that the nozzle member includes a cylindrical nozzle plug, a cylindrical valve seat body inserted into the nozzle plug, and the elastic valve element fixed between the nozzle plug and the valve seat body, wherein the nozzle plug is provided with the support portion and the nozzle, and the valve seat body is provided with the valve seat.

In the nozzle member as described above, it is preferable that the nozzle is a droplet nozzle.

A first aspect of a squeeze container of the present invention includes a container with flexibility, and the nozzle member according to any one of aspects of the present invention.

A second aspect of the squeeze container of the present invention includes a container having flexibility and including a nozzle, and the check valve structure according to any one of the aspects of the present invention.

In the squeeze container according to the second aspect of the present invention, it is preferable that the nozzle is a droplet nozzle.

Advantageous Effects of Invention

The check valve structure of the present invention includes the elastic valve element that has the annular outer edge portion and the inner portion surrounded by the outer edge portion, and the outer edge portion is restrained (supported) by the support portion and the elastic valve element. Thus, the elastic valve element deforms in two stages where the inner portion and the outer edge portion deform in order due to pressure of fluid from upstream, so that the check valve structure does not open easily even if an unexpected pressure is applied to the elastic valve element. In addition, when the check valve structure is used for a squeeze container or the like for which a user operates the amount of discharge (flow rate), individual differences in the amount of discharge (flow rate) can be favorably reduced. Further, when pressure of fluid from the upstream is not applied, the fluid in a support can be drawn back by returning of the inner portion to the original shape (first deformation). Particularly, in the case of a discharge container (squeeze container), residual liquid near a discharge hole can be favorably prevented.

In the check valve structure of the present invention, when the elastic valve element is fixed by holding the outer edge portion of the elastic valve element between the annular upstream support portion of the valve seat and the annular downstream support portion of the support portion, a seal structure is formed by annular contact between the upstream support portion of the valve seat and the upstream end surface of the outer edge portion of the elastic valve element, and a communication passage is formed in an annular contact portion between the downstream support portion of the support portion and the downstream end surface of the outer edge portion of the elastic valve element, a pressing direction for forming the sealing structure in the outer edge portion of the elastic valve element and a supporting direction for forming a fixing structure of the outer edge portion of the elastic valve element are parallel to a flow of the fluid. As a result, the check valve structure can be accurately operated. In addition, the upstream end surface of the outer edge portion of the elastic valve element also serves as a seal portion and the support portion of the elastic valve element, so that the entire structure of the check valve structure is simple and the check valve can be easily assembled.

When the elastic valve element is held between the valve seat and the support portion, and the recessed portion constituting the communication passage is formed in the downstream support portion, or the notch constituting the communication passage is formed in the downstream end surface of elastic valve element, as described above, the communication passage can be easily formed. In addition, when a plurality of recessed portions or notches are annularly provided at regular intervals, the held elastic valve element is less likely to have distortion, thereby enabling reliable sealing. Further, fluid can uniformly flow through the check valve structure.

When the elastic valve element is held between the valve seat and the support portion, and the upstream support portion is the upper end opening of the valve seat, a holding structure of the elastic valve element can be simplified.

When the elastic valve element is held between the valve seat and the support portion, and at least a part of the outer edge portion is thicker than the inner portion, a difference between pressure required to elastically deform the outer edge portion and pressure required to elastically deform the inner portion can be increased. This enables increase in the amount of fluid to be drawn back due to returning of the inner portion to the original shape. This also increases play when a squeeze container or the like is compressed.

When the elastic valve element is held between the valve seat and the support portion, at least a part of the outer edge portion of the elastic valve element is thicker than the inner portion, and the upstream support portion is the annular inner flange formed on the inner surface of the valve seat, the elastic valve element is substantially housed in the valve seat. As a result, the elastic valve element can be easily handled in an assembling step. The inner surface of the upper portion of the valve seat (above the inner flange) radially supports the elastic valve element.

When the elastic valve element is held between the valve seat and the support portion, and an outer peripheral end of the outer edge portion is held, a position of the elastic valve element can be accurately adjusted in the assembling step. Further, an outer peripheral end of the elastic valve element deforms to be able to prevent a trouble such as a positional displacement of the elastic valve element and deterioration in performance of the check valve.

In the check valve structure of the present invention, when a fixing structure and a seal structure of the elastic valve element are formed by fitting an outer surface of one of the outer edge portion of the elastic valve element and the inner cylindrical portion of the upstream support portion into an inner surface of the other of the outer edge portion and the inner cylindrical portion, the entire structure of the check valve structure is simple and assembly thereof is easy.

As described above, when the elastic valve element is fixed by being fitted with the support portion, and a clearance is provided between the upstream surface of the inner portion of the elastic valve element and (the downstream end of) the inner cylindrical portion of the valve seat, and a clearance is provided between the upstream end surface of the outer edge portion of the elastic valve element and the upper surface (the downstream surface) of the flange portion of the valve seat, fluid can smoothly flow by being caused to pass through the respective clearances.

When at least a part of the inner portion is thin in the check valve structure of the present invention, elasticity of the inner portion can be increased to be able to increase the amount of fluid to be drawn back due to returning of the inner portion to the original shape. This also enables increase in difference between pressure at which the inner portion elastically deforms and pressure at which the outer edge portion starts to elastically deform, thereby increasing a play when a squeeze container or the like is compressed. When the inner portion is curved so as to project upstream, it is possible to further increase the amount of fluid to be drawn back due to returning of the inner portion to the original shape.

The nozzle member of the present invention includes the check valve structure according to any one of the above-mentioned aspects of the present invention, and the nozzle provided downstream of the support portion of the check valve structure, so that it is possible to obtain a discharge container, particularly a squeeze container, with a stable amount of discharge (flow rate) of contents by simply attaching the nozzle member to a flexible container.

When the nozzle member as described above includes a cylindrical nozzle plug, a cylindrical valve seat body inserted into the nozzle plug, and the elastic valve element fixed between the nozzle plug and the valve seat body, the nozzle plug is provided with the annular support portion and the nozzle, and the valve seat body is provided with the valve seat, it is easy to assemble the nozzle member. Particularly, the nozzle being a droplet nozzle is preferable.

The first aspect of the squeeze container of the present invention includes a container with flexibility, and the nozzle member of the present invention, and the second aspect of the squeeze container of the present invention includes a flexible container provided with a nozzle, and the check valve structure of the present invention provided in the container, so that contents thereof do not flow back, thereby being hygienic. When a container is squeezed to discharge its contents, individual differences in the amount of discharge are less likely to occur. The squeeze container is also capable of preventing liquid from remaining near a nozzle after use.

When the nozzle is a droplet nozzle in the squeeze container of the present invention, a feed rate to the droplet nozzle is stable, whereby operation is simple.

BRIEF DESCRIPTION OF DRAWINGS

FIG. 5A is a side sectional view illustrating yet another embodiment of the nozzle member of the squeeze container of the present invention, FIG. 5B is a bottom view of an upper bottom portion of a nozzle plug, FIG. 5C is a side sectional view illustrating yet another embodiment of the nozzle member of the squeeze container of the present invention, FIG. 5D is a side sectional view illustrating yet another embodiment of the nozzle member of the squeeze container of the present invention, and FIG. 5E is a bottom view of an upper bottom portion of a nozzle plug.

DESCRIPTION OF EMBODIMENTS

Figure 1:
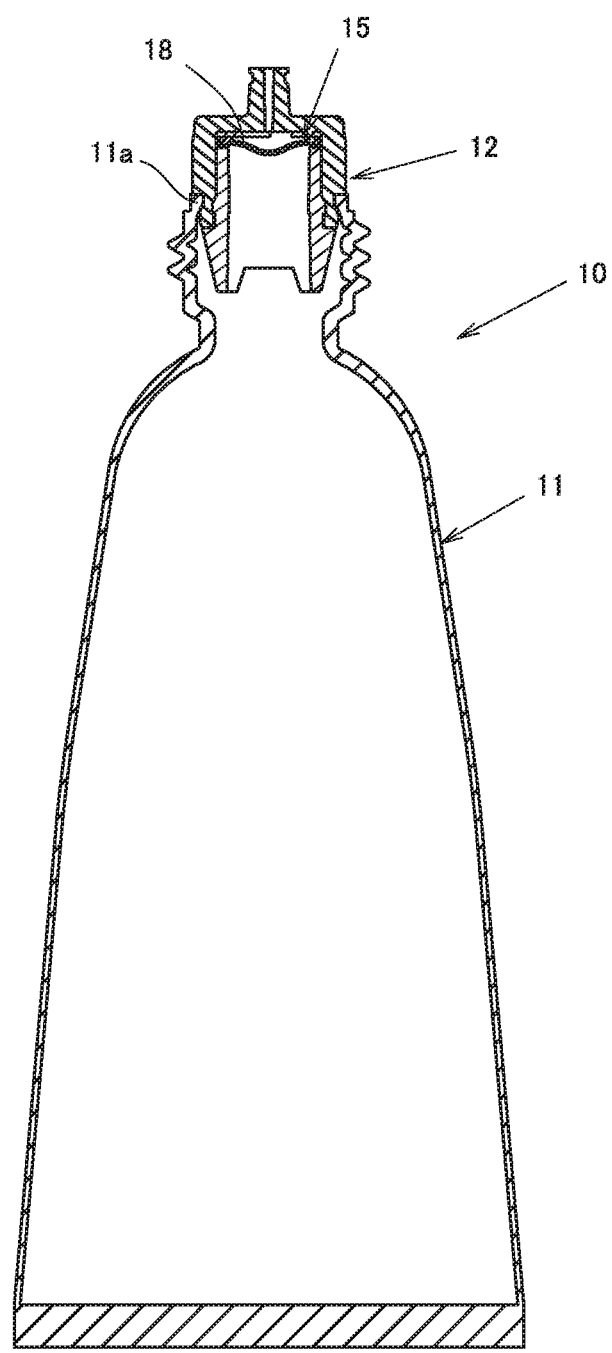
FIG. 1 is a side sectional view illustrating an embodiment of the squeeze container of the present invention.

The squeeze container 10 of FIG. 1 includes a container 11 with flexibility, and a nozzle member 12 attached to an opening of the container 11. The nozzle member 12 is provided with a check valve structure 15 that is closed in an unloaded state, and that blocks a flow of substances from the outside air and allows a flow of contents from the container 11 (upstream). The check valve structure 15 is opened when the elastic valve element 18 elastically deforms in two stages due to pressure of contents from the container 11.

The container 11 is a squeeze container that discharges an internal liquid when its body portion or the like is squeezed to contract the inside thereof, for example. Then, a cap (not illustrated) is screwed into the opening to close the container 11. The opening is provided with a nozzle coupling portion 11a to be coupled to the nozzle member 12. The container 11 may elastically deform to return to an original shape when its inside is contracted and deformed.

It is preferable that the container 11 is molded from a material with flexibility, particularly a material having elasticity so as to elastically deform. Other than the container illustrated in FIG. 1, for example, a double structure in which an inner container is squeezed when contents are discharged is available.

Figure 2A:
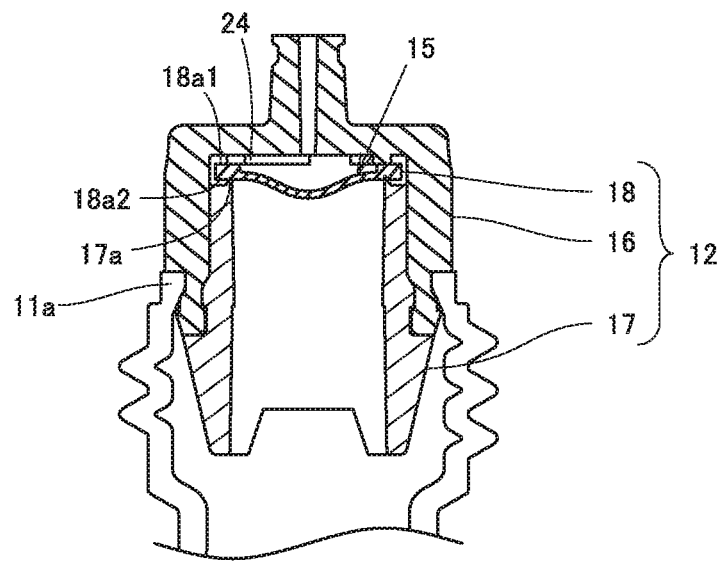
FIG. 2A is a side sectional view of a nozzle member of the squeeze container of FIG. 1, FIGS. 2B and 2C are respectively a side sectional view of a nozzle plug and a bottom view of an upper bottom portion of the nozzle member.

As illustrated in FIG. 2A, the nozzle member 12 includes a cylindrical nozzle plug 16 fixed to the opening of the container 11, a cylindrical valve seat body 17 inserted into the nozzle plug 16, and the elastic valve element 18 fixed therebetween.

Figure 2B:
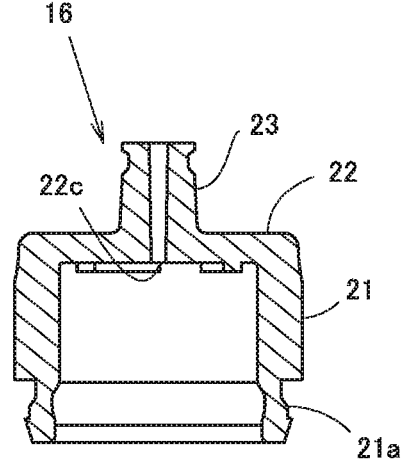
FIG. 2D is a side sectional view of a valve seat body of the nozzle member.
FIG. 2E is a side sectional view of an elastic valve element of the nozzle member.

The nozzle plug 16 is inserted into the opening of the container 11 and closes the opening thereof. More specifically, the nozzle plug 16 includes a cylindrical nozzle base 21, an upper bottom portion 22 for closing an upper end of the nozzle plug 16, and a cylindrical nozzle 23 extending upward through the upper bottom portion 22, as illustrated in FIG. 2B. The nozzle plug 16 is molded from a synthetic resin, for example.

The nozzle base 21 is a cylindrical body that houses the valve seat body 17 and the elastic valve element 18. The nozzle base 21 has a cylindrical lower end 21a serving as a nozzle coupled portion to be coupled to the nozzle coupling portion 11a of the container 11. Coupling structure between the nozzle coupling portion 11a and the nozzle coupled portion is not particularly limited. The nozzle coupled portion may be positioned in the nozzle base 21. The lower end 21a also serves as a valve seat coupling portion to be coupled to the valve seat body 17. The valve seat coupling portion may also be positioned in the nozzle base.

Figure 2D:
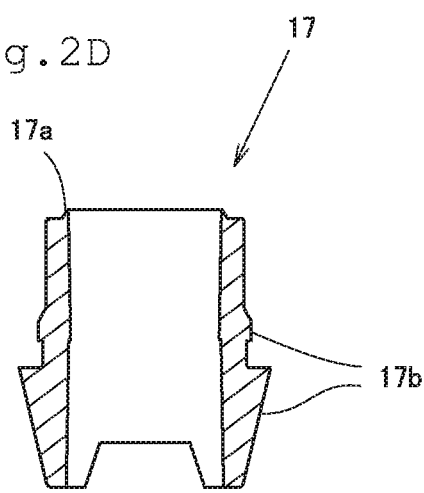
Figure 2C:
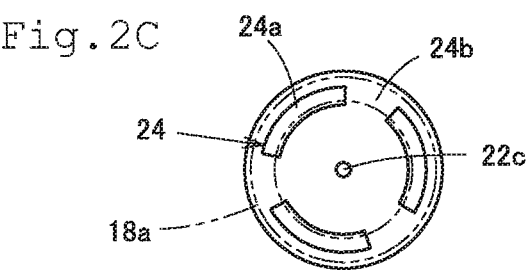

The upper bottom portion 22 has a shape of a disk having a center hole 22c communicating with the nozzle 23. The upper bottom portion 22 is provided on its lower surface with an annular downstream support portion 24 for supporting the elastic valve element 18 from downstream, as illustrated in FIG. 2C. The downstream support portion 24 is formed such that a projecting portion 24a projecting upstream and a recessed portion 24b recessed downstream from the projecting portion 24a are alternately provided. The recessed portion 24b constitutes a communication passage that communicates through the downstream support portion 24. In the present embodiment, three projecting portions 24a are provided at regular intervals in the circumferential direction. The imaginary line in FIG. 2C shows an outer edge portion 18a of the elastic valve element 18 described later. When the downstream support portion 24 has a communication passage communicating therethrough, structure of the projecting portion 24a and the recessed portion 24b, or the number of the projecting portions 24a and/or the recessed portions 24b, is not particularly limited. When a plurality of recessed portions 24b are annularly provided at regular intervals, the elastic valve element 18 is prevented from having distortion. As a result, sealability is less likely to deteriorate when the container 11 is used. As described later, the communication passage allowing the nozzle plug 16 and the valve seat body 17 to communicate with each other is formed, so that contents can uniformly flow.

The nozzle 23 is a cylindrical body serving as a discharge port of the contents. In the present embodiment, the nozzle 23 is a droplet nozzle.

The valve seat body 17 is inserted into the nozzle plug 16 coaxially with the nozzle plug 16. As illustrated in FIG. 2D, an upper end of an opening of the valve seat body 17 is an annular support projection (upstream supporting portion) 17a for supporting the elastic valve element 18 with a sealing effect. The support projection 17a has a substantially triangular section and a sharpened upper end. Meanwhile, a lower portion of the valve seat body 17 is a valve seat coupled portion 17b coupled to the lower end 21a of the nozzle base 21. Coupling structure between the lower end (valve seat coupling portion) 21a and the valve seat coupled portion 17b is also not particularly limited.

Figure 2E:
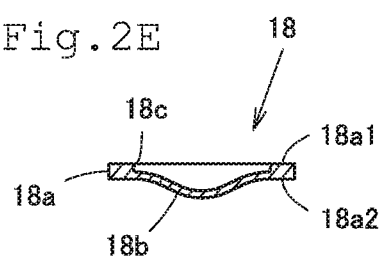

As illustrated in FIG. 2E, the elastic valve element 18 includes a thick outer edge portion 18a and a thin inner portion 18b surrounded by the outer edge portion 18a. That is, the inner portion 18b has larger elasticity than that of the outer edge portion 18a and deforms greatly when receiving an external force in the vertical direction. The elastic valve element 18 is also provided coaxially with the nozzle plug 16 and the valve seat body 17. The elastic valve element 18 is molded from an elastic synthetic resin, synthetic rubber, or the like.

The outer edge portion 18a is held between the downstream support portion 24 of the upper bottom portion 22 of the nozzle plug 16 and the support projection (upstream support portion) 17a of the valve seat body 17. That is, a downstream end surface 18a1 of the outer edge portion 18a is partially in contact with the downstream support portion 24 (substantially the projecting portion 24a) of the nozzle plug 16, and an upstream end surface 18a2 of the outer edge portion 18a is in contact with the entire circumference of the support projection 17a of the valve seat body 17, in an unloaded state, as illustrated in FIG. 2A. While the outer edge portion 18a has an annular shape, its shape is not particularly limited as long as it is annular.

The inner portion 18b is an elastic plate that is curved so as to project upstream. The elastic valve element 18 is disposed such that a stepped portion 18c between the outer edge portion 18a and the inner portion 18b faces downstream. While the inner portion 18b has a disk shape, its shape is appropriately determined according to the outer edge portion.

At least a part of the outer edge portion 18a may be thicker than the inner portion 18b as long as the outer edge portion 18a can reliably seal the nozzle plug 16 and the valve seat body 17 in an unloaded state. For example, the outer edge portion 18a may not have a uniform thickness, and may have a thinner portion than the inner portion 18b as long as it has a thicker portion than the inner portion in at least a partial region of the outer edge portion. Particularly, it is preferable that at least a part of a region held between the upstream support portion and the downstream support portion is thick. It is further preferable that a thick region is annularly formed.

Next, the check valve structure of the nozzle member 12 will be described.

The check valve structure 15 includes the upstream support projection 17a (valve seat) of the valve seat body 17, the downstream support portion 24 (support portion) of the upper bottom portion 22 of the nozzle plug 16, and the elastic valve element 18 pressed and fixed therebetween. In an unloaded state, the upstream end surface 18a2 of the outer edge portion of the elastic valve element 18 is annularly and elastically in contact with the valve seat (the support projection 17a), and a passage between the support projection 17a and the downstream support portion 24 is closed by the elastic valve element 18 (closed state).

When the elastic valve element 18 of the check valve structure 15 receives pressure from downstream of the elastic valve element 18 (above the elastic valve element 18 in FIG. 1), the inner portion 18b of the elastic valve element 18 receives the pressure. However, the pressure does not affect the contact between an upstream end surface of the outer edge portion 18a forming the seal and the support projection 17a of the valve seat body 17. Thus, the closed state described above is maintained.

Figure 3A:
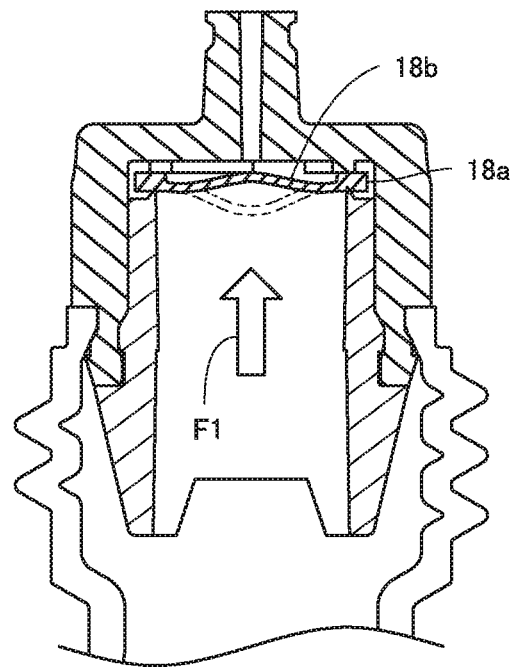
FIGS. 3A and 3B are schematic views respectively illustrating a first deformation state and a second deformation state of an elastic valve element of a nozzle member.
Figure 3B:
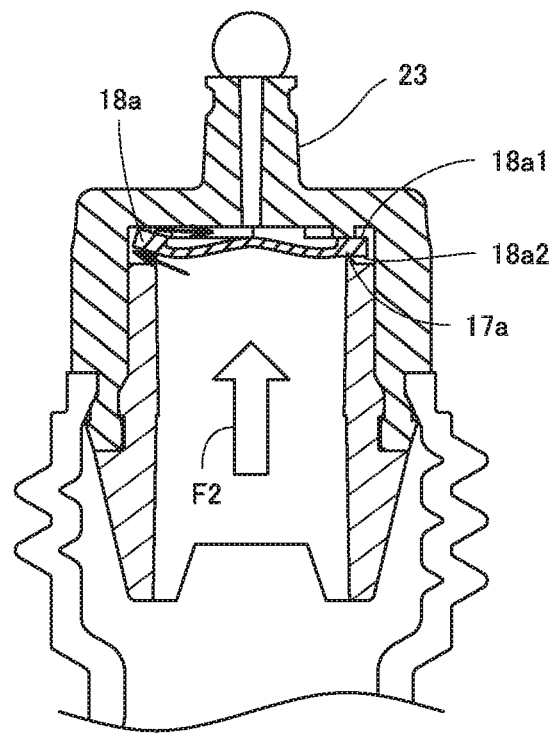

Meanwhile, when the elastic valve element 18 of the check valve structure 15 receives pressure from upstream of the elastic valve element 18, or contents receive the pressure from the container 11, the inner portion 18b of the elastic valve element 18 receives pressure F1 of the contents to cause the inner portion 18b projecting upstream to deform so as to project downstream (first deformation), as illustrated in FIG. 3A. The check valve structure 15 is configured such that the center hole 22c of the nozzle plug 16 is not blocked when the inner portion 18b deforms downstream. At this time, the outer edge portion 18a of the elastic valve element 18 is not yet elastically deformed, so that the closed state described above is maintained. As illustrated in FIG. 3B, when receiving pressure F2 greater than the pressure F1 from the container, the outer edge portion 18a elastically deforms so as to undulate according to unevenness of the downstream support portion 24 of the nozzle plug 16 (second deformation). This causes the seal between the upstream end surface 18a2 of the elastic valve element 18 and the support projection 17a of the valve seat body 17 to be released. Then, the contents pass around an outer peripheral edge of the elastic valve element 18, and pass through a clearance between the downstream end surface 18a1 of the elastic valve element 18 and the recessed portion 24b (communication passage) of an outer peripheral edge of the nozzle plug 16 to reach the nozzle 23 (refer to the arrow in FIG. 3B).

In the present embodiment, a thickness of the outer edge portion 18a of the elastic valve element 18 is greater than a thickness of the inner portion 18b, but may be substantially identical thereto. This case also causes the outer edge portion 18a to be held and constrained between the nozzle plug 16 and the valve seat body 17, so that the outer edge portion 18a is less likely to deform as compared with the inner portion 18b. This results in two-stage deformation as described above. However, it is preferable to provide a difference in elasticity between the outer edge portion 18a and the inner portion 18b because a high effect can be obtained regardless of fitting conditions of the elastic valve element 18, thereby increasing productivity.

In the present embodiment, the first deformation of the inner portion 18b is elastic deformation returning to its original shape when the pressure F1 from the container is released. However, it may be deformation that is not returned when the pressure F1 is released. In that case, an elastic container 11 is used. That is, when the compressed and deformed container 11 is elastically returned, the inside of the container 11 is reduced in pressure to cause a suction force. The suction force causes the inner portion 18b deformed downstream to be returned to its original shape. This enables remaining liquid as described above to be prevented.

As described above, the check valve structure 15 of the nozzle member 12 is configured to cause the elastic valve element 18 to deform in two stages in response to pressure, so that the inner portion 18b deforms (or elastically deforms) with low pressure to absorb the pressure (first deformation). As a result, the valve does not unnecessarily open. Particularly, when being used for a squeeze container with a small amount of discharge, the check valve structure 15 is capable of reducing individual differences in the amount of discharge. In addition, even when the squeeze container 10 receives an unexpected external force, such as being dropped, contents thereof are not unnecessarily discharged.

After use, the sealing effect of the outer edge portion 18a and the support projection 17a returns to prevent a substance from being sucked from the outside air. When the inner portion 18b elastically deforms after use, an elastic force thereof causes the inner portion 18b to project upstream. Alternatively, when the inner portion 18b inelastically deforms, an elastic force of a compressed body portion of the container 11 causes the inner portion 18b projecting downstream to project upstream. When the inner portion 18b returns its original shape, liquid in the nozzle 23 is drawn back to the inside to enable the liquid to be prevented from remaining near the opening of the nozzle 23. Particularly, the inner portion 18b is curved upstream, so that a large amount of liquid can be drawn to enable the liquid to be further prevented from remaining. Even if the inner portion 18b is not curved but flattened, it is possible to draw remaining liquid near the opening of the nozzle 23 due to returning of the inner portion 18b to the original shape.

Figure 4A:
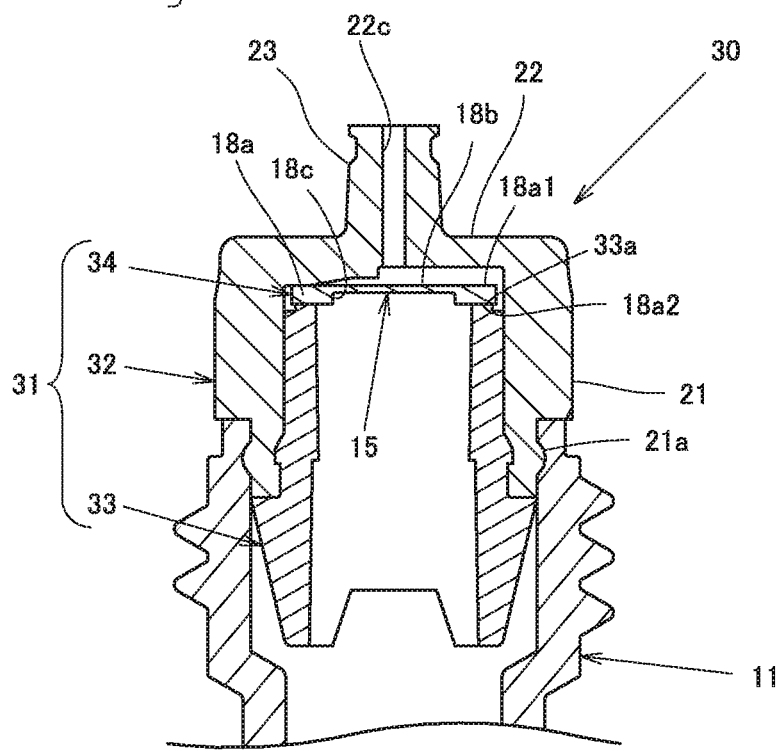
FIG. 4A is a side sectional view illustrating another embodiment of the nozzle member of the squeeze container of the present invention.

FIG. 4 illustrates a squeeze container 30 that has a space (liquid reservoir space) located downstream of an elastic valve element, the space being smaller than that of the squeeze container 10 of FIG. 1. The squeeze container 30 includes a container 11 similar to the squeeze container 10 of FIG. 1, and a nozzle member 31 attached to an opening of the container 11.

The nozzle member 31 includes a cylindrical nozzle plug 32 fixed to the opening of the container 11, a cylindrical valve seat body 33 inserted into the nozzle plug 32, and an elastic valve element 34 supported therebetween. The nozzle member 31 is also provided with a check valve structure 15.

The nozzle plug 32 is substantially the same as the nozzle plug 16 of the squeeze container of FIG. 1 except for a difference in structure of a lower surface of an upper bottom portion 22 supporting the elastic valve element 34 from downstream.

Figure 4B:
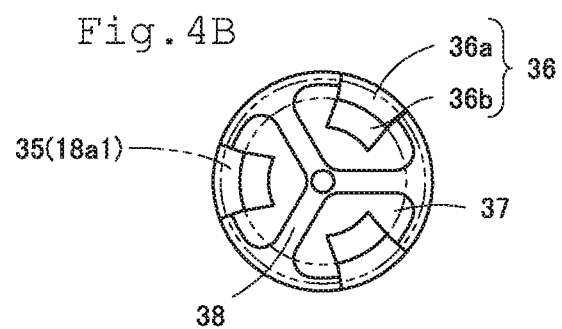
FIG. 4B is a bottom view of an upper bottom portion of the nozzle plug.

As illustrated in FIG. 4B, the lower surface of the upper bottom portion 22 includes a plurality of projecting portions 36 that are annularly disposed, a plurality of expanded portions 37 provided so as to surround the projecting portions 36, being lower than the projecting portions 36, and recessed portions 38 each provided between the corresponding adjacent expanded portions 37, extending from an outer edge of the lower surface to the center thereof.

The projecting portion 36 is a fan-shaped projection extending radially inward from the outer edge of the lower surface, and includes an outer protrusion 36a having a flat projecting surface, and an inner protrusion 36b having a curved projecting surface formed so as to have height decreasing radially inward.

The expanded portion 37 is a fan-shaped projection surrounding the projecting portion 36.

The imaginary lines in FIG. 4B show an annular downstream support portion 35 that supports the elastic valve element 18 and is brought into contact with a downstream end surface 18a1. The downstream support portion 35 includes the outer protrusion 36a, the expanded portion 37, and the recessed portion 38, and has irregularities with respect to the elastic valve element 34.

The shape of the downstream support portion 35 is not particularly limited as long as a communication passage from the outer edge of the lower surface of the upper bottom portion 22 to the center hole 22c can be secured. However, it is preferable to dispose a plurality of communication passages (recessed portions 38) extending from the outer edge toward the center hole 22c at regular intervals because the elastic valve element 34 is prevented from being distorted to cause sealability to be less likely to deteriorate, thereby allowing contents to flow smoothly.

The projecting portion 36 (the outer protrusion 36a) extends to the outer edge, so that an outer peripheral end of the elastic valve element 34 can be firmly supported. Thus, the elastic valve element 34 is less likely to be displaced when being assembled, thereby facilitating an assembling step. This also enables prevention of a trouble such as a positional displacement of the elastic valve element 34 due to deformation of its outer peripheral end and deterioration in performance of the check valve.

When the expanded portion 37 and the inner protrusion 36b are provided, an internal space (space located downstream of the elastic valve element 34) in the nozzle plug 32 can be reduced, that is, the liquid reservoir space can be reduced.

The valve seat body 33 is substantially the same as the valve seat body 17 of FIG. 1 except that an outer peripheral edge of the elastic valve element 34 is supported by a flat upper end surface (upstream support portion) 33a. The entire outer edge portion 18a of the elastic valve element 34 can be supported by the upper end surface 33a to enable the outer peripheral end of the elastic valve element 34 to be prevented from elastically deforming. In addition, the valve seat body 33 is in surface contact with the upstream end surface 18a2 of the outer edge portion 18a of the elastic valve element 34, so that the elastic valve element 34 can be reliably opened at the time of the second deformation.

The elastic valve element 34 is substantially the same as the elastic valve element 18 of FIG. 1 except that the inner portion 18b of the elastic valve element 34 is a flat thin plate and that the stepped portion 18c between the outer edge portion 18a and the inner portion 18b is disposed so as to face upstream. While the amount of liquid to be drawn back by returning of the elastic valve element 34 to the original shape decreases when the elastic valve element 34 is formed like a plate as described above, the liquid reservoir space can be reduced. When the container 11 has elasticity, the container is elastically returned slightly after contents are discharged. Then, the check valve structure prevents a substance from being sucked from the outside air to cause the inside of the container 11 to be reduced in pressure. This causes the inner portion 18b in the shape of a flat plate to receive a force to be displaced upstream. The inner portion 18b may be curved and displaced upstream by this displacing force in an unloaded state, as with the elastic valve element 18 of FIG. 1. In this case, it is possible to increase the amount of liquid to be drawn back. When being filled with contents, the inside of the container may be filled while being reduced in pressure. This case also enables the inner portion 18b of the elastic valve element 34 to be curved so as to project upstream like the inner portion 18b of the elastic valve element 18 in FIG. 2. As a result, the amount of liquid to be drawn back can be increased.

The nozzle member 31 also has a check valve structure similar to that of the nozzle member 12 of FIG. 1. The elastic valve element 34 deforms in two stages and opens for contents from the container. Specifically, the check valve structure 15 includes the upper end surface 33a (valve seat) of the valve seat body 33 on an upstream side, the downstream support portion 35 (support portion) of the upper bottom portion 22 of the nozzle plug 32 on a downstream side, and the elastic valve element 34 pressed and fixed therebetween. In an unloaded state, the upstream end surface 18a2 of the outer edge portion of the elastic valve element 34 is annularly and elastically in contact with the upper end surface 33a, and a passage between the upper end surface 33a and the downstream support portion 35 is closed by the elastic valve element 34 (closed state).

Thus, the inner portion 18b first elastically deforms downstream (first deformation) for contents from the container while the closed state is maintained. As pressure of the contents from the container increases, the outer edge portion 18a elastically deforms (second deformation) according to irregularities of the downstream support portion 35 of the nozzle plug 32 to release the seal between the upper end surface 33a (upstream support portion) and the elastic valve element 34. The valve seat body 33 has the upstream support portion that is not a projection but a contact surface (upper end surface 33a). Similarly to the nozzle member 12 of FIG. 1, the valve is not opened unnecessarily, and is particularly and preferably used for a squeeze container. The nozzle member 31 can also prevent liquid from remaining near the opening of the nozzle 23 due to returning of the inner portion 18b to the original shape, after use.

FIG. 5 illustrates a squeeze container 40 that has high sealability in an unloaded state as compared with the squeeze containers 10 and 30 of FIGS. 1 and 4. The squeeze container 40 includes a container 11 similar to the squeeze container 10 of FIG. 1, and a nozzle member 41 attached to an opening of the container 11.

The nozzle member 41 includes a cylindrical nozzle plug 42 fixed to the opening of the container 11, a cylindrical valve seat body 43 inserted into the nozzle plug 42, and an elastic valve element 44 inserted into the valve seat body 43 while being supported between the nozzle plug 42 and the valve seat body 43.

As illustrated in FIGS. 5A and 5B, the nozzle plug 42 is substantially the same as the nozzle plug 32 of the squeeze container 30 of FIG. 4 except that an outer end portion of an upper bottom portion 22 is provided with an annular outer groove 42a into which an upper end of the valve seat body 43 is inserted, and that an inner surface 42b of a leading end of the nozzle 23 is formed in the shape of a mortar or a horn. The nozzle plug 42 includes a downstream support portion 35 (a portion to be brought into contact with a downstream end surface 18a1 of the elastic valve element 44) provided on a lower surface of the upper bottom portion 22, and including a projecting portion 36, an expanded portion 37, and a recessed portion 38.

While a nozzle coupled portion at a lower end 21a of a nozzle base 21 is different in shape from the nozzle coupled portion of FIG. 1, it is not particularly limited as long as it couples the container 11 to the nozzle member 12.

The valve seat body 43 is substantially the same as the valve seat body 17 of the squeeze container in FIG. 2 except that an inner flange 43a for supporting the elastic valve element 44 is formed on an upper inner surface of the valve seat body 43, and that an upper end of the valve seat body 43 is inserted into the annular outer groove 42a of the nozzle plug 42.

The inner flange 43a supporting the elastic valve element 44 is formed on the upper inner surface, so that the elastic valve element 44 can be stably disposed regardless of a coupled state between the nozzle plug 42 and the valve seat body 43. That is, the elastic valve element 44 can be supported at an upper portion of the valve seat body 43 in a planar direction before being assembled (before being coupled). This facilitates an assembling (coupling) step. The valve seat body 43 is also capable of accurately holding an outer end of an outer edge portion 18a of the elastic valve element 44.

The elastic valve element 44 has the outer edge portion 18a with a height (thickness) higher (thicker) than that of the squeeze container 10 of FIG. 1 or the squeeze container 30 of FIG. 4. This height can be appropriately determined according to a position of the inner flange 43a of the valve seat body 43 (a depth from an upper end of the nozzle base 21). Increase in height of the outer edge portion 18a to more than a certain level enables sealability in an unloaded state to be enhanced. When the height of the outer edge portion 18a is increased, the outer edge portion 18a is less likely to elastically deform. In this case, the outer edge portion 18a may be configured to compressively deform downstream. For example, when the height of the outer edge portion 18a of the elastic valve element 44 is further increased as in the squeeze container 40a of FIG. 5C, sealability is further enhanced in an unloaded state.

The nozzle member 41 also has a check valve structure similar to that of the nozzle member 31 of FIG. 3. The elastic valve element 44 deforms in two stages and opens for contents from the container. The squeeze container 40 has a check valve structure 15 that includes the inner flange 43a (valve seat) of the valve seat body 43 on an upstream side, the downstream support portion 35 (support portion) of the upper bottom portion 22 of the nozzle plug 42 on a downstream side, and the elastic valve element 44 pressed and fixed therebetween. In an unloaded state, an upstream end surface 18a2 of the outer edge portion of the elastic valve element 44 is annularly and elastically in contact with the inner flange 43a, and a passage between the inner flange 43a and the downstream support portion 35 is closed by the elastic valve element 44 (closed state).

That is, the inner portion 18b first elastically deforms downstream (first deformation) for contents from the container while the closed state is maintained. As pressure of the contents from the container increases, the downstream end surface 18a1 of the outer edge portion 18a elastically deforms to undulate according to irregularities of an outer peripheral edge of the nozzle plug 42, or a lower end portion of the outer edge portion 18a compressively deforms (e.g., the upstream end face 18a2 rises as shown by the imaginary line in FIG. 5C) (second deformation). It is possible to appropriately select which elastic deformation is used depending on thickness of the outer edge portion and the like. The second deformation of the outer edge portion 18a releases the seal with the elastic valve element 44. Thus, the valve is not unnecessarily opened, and is particularly and preferably used for a squeeze container, similarly to the nozzle member 12 of FIG. 1. Similarly to another nozzle member, the nozzle member 41 can prevent a substance from being sucked from the outside air by the effect of the check valve structure, and prevent liquid from remaining near the opening of the nozzle 23 due to returning of the inner portion 18b to the original shape, after use.

The inner portion 18b of the elastic valve element 44 in each of FIGS. 5A and 5C may be curved so as to project upstream side like the inner portion 18b of the elastic valve element 18 in FIG. 2. As a result, the amount of liquid to be drawn back can be increased.

FIG. 5D illustrates a squeeze container 50 in which a notch 54a through which contents pass is formed downstream of an elastic valve element 54. The squeeze container 50 includes a container 11 similar to the squeeze container 10 of FIG. 1, and a nozzle member 51.

The nozzle member 51 includes a cylindrical nozzle plug 52 fixed to an opening of the container 11, a cylindrical valve seat body 53 inserted into the nozzle plug 52, and an elastic valve element 54 housed in the valve seat body 53 while being supported between the nozzle plug 52 and the valve seat body 53.

As illustrated in FIG. 5D and FIG. 5E, the nozzle plug 52 is substantially the same as the nozzle plug 16 of FIG. 1 except that the entire lower surface of an upper bottom portion 22 includes a projecting portion 36 having an outer protrusion 36a extending radially inward from near an outer edge portion, and an inner protrusion 36b with height gradually decreasing radially inward, along with an annular outer groove 52a. That is, the downstream support portion 35 includes the outer protrusion 36a and the inner protrusion 36b.

The valve seat body 53 is substantially the same as the valve seat body 43 of the squeeze container 40 in FIG. 5A.

The elastic valve element 54 includes the notch 54a formed in an upper surface of an outer edge portion 18a and an inner portion 18b, the notch 54a extending radially inward from an outer edge of the upper surface. The notch 54a serves as a communication passage connecting the outer edge and the center hole 22c between the elastic valve element 54 and a lower surface of the upper bottom portion 22 of the nozzle plug 52. Other structures are substantially the same as those of the elastic valve element 44 of the squeeze container 40 in FIG. 5A.

The nozzle member 51 also includes a check valve structure 15, similarly to the squeeze container 40 of FIG. 5A, and the elastic valve element 54 deforms in two stages to open for contents from the container. Thus, the valve does not unnecessarily open. The nozzle member 51 can also prevent liquid from remaining near the opening of the nozzle 23 due to returning of the inner portion 18b to the original shape, after use.

Figure 6A:
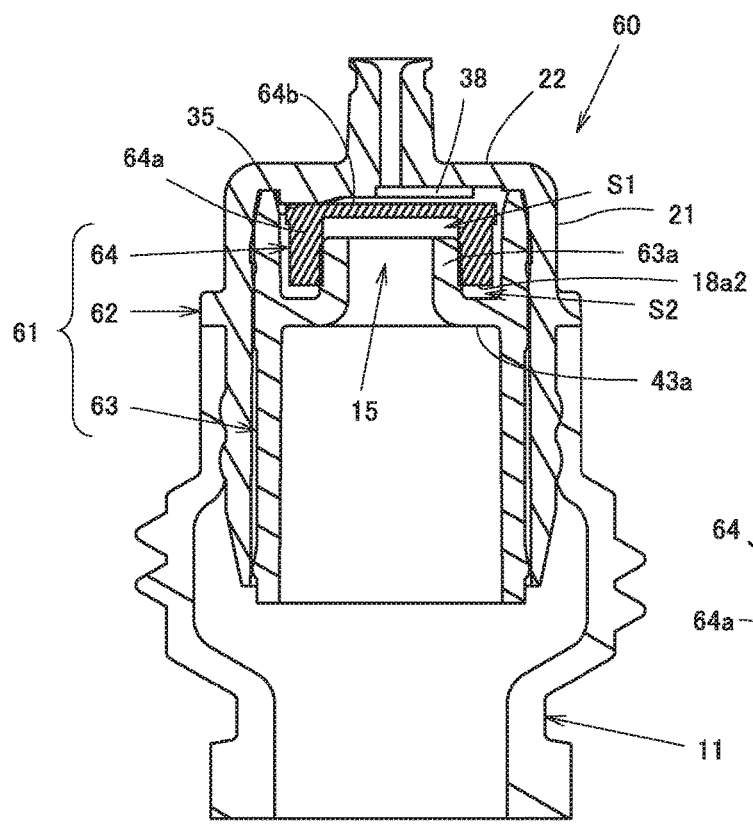
FIG. 6A is a side sectional view illustrating another embodiment of the nozzle member of the squeeze container of the present invention.

FIG. 6A illustrates a squeeze container 60 including a nozzle member 61 fixed by fitting an elastic valve element with a valve seat body. The squeeze container 60 includes a container 11 similar to the squeeze container 10 of FIG. 1, and a nozzle member 61 attached to an opening of the container 11.

The nozzle member 61 includes a cylindrical nozzle plug 62 fixed to the opening of the container 11, a cylindrical valve seat body 63 inserted into the nozzle plug 62, and an elastic valve element 64 to be fitted with the valve seat body 63.

Figure 6B:
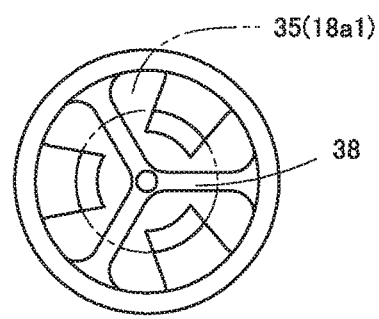
FIG. 6B is a bottom view of an upper bottom portion of a nozzle plug.

The nozzle plug 62 is substantially the same as the nozzle plug 42 of the squeeze container 40 in FIG. 5A, and includes an upper bottom portion 22 having a lower surface provided with a passage (recessed portion 38) for allowing an outer edge of the lower surface to communicate with a center hole thereof (refer to FIG. 6B).

The valve seat body 63 is substantially the same as the valve seat body 43 of the squeeze container 40 in FIG. 5A except that an inner cylindrical portion 63a extending downstream from an inner end of an inner flange 43a is formed. The inner cylindrical portion 63a may have an outer surface that is slightly inclined so as to spread upstream.

Figure 6C:
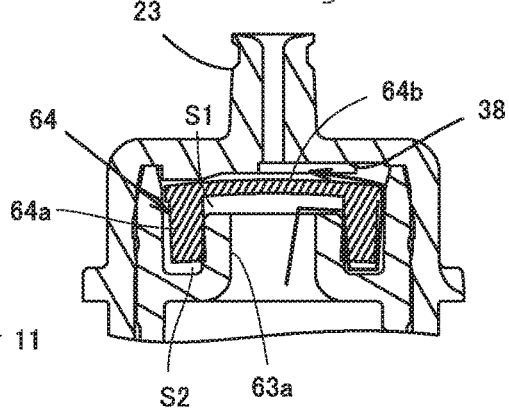
FIG. 6C is a schematic view illustrating a second deformation state of an elastic valve element of the nozzle member, and FIGS. 6D and 6E each are a side sectional view illustrating a part of yet another embodiment of the nozzle member of the present invention.
Figure 6D:
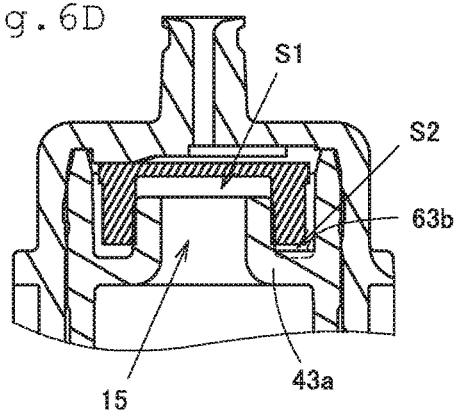
Figure 6E:
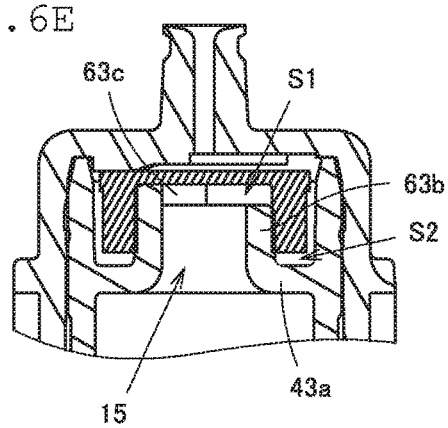

The elastic valve element 64 includes a cylindrical outer edge portion 64a and a thin inner portion 64b for closing an upper end of the outer edge portion 64a. The outer edge portion 64a has a height less than a distance between the inner flange 43a and a downstream support portion 35 when the valve seat body 63 is attached to the nozzle plug 62. That is, the elastic valve element 64 is locked by fitting between the outer edge portion 64a and the inner cylindrical portion 63a when the nozzle member 61 is assembled. There is an annular clearance S1 between an upper end (a downstream end) of the inner cylindrical portion 63a of the valve seat body 63 and a lower surface (an upstream surface) of the inner portion 64b of the elastic valve element 64, and there is an annular clearance S2 between an upper surface (a downstream surface) of the inner flange 43a of the seat body 63 and an upstream end surface 18a2 of the outer edge portion of the elastic valve element 64. However, each of the clearances S1 and S2 is not required to be annular and to have a constant distance (height). For example, a raised portion 63b may be provided on a part of an upper surface of the inner flange 43a to reduce a part of the clearance S2, as illustrated in FIG. 6D. When the clearance S2 is reduced as described above, a space located downstream of the elastic valve element 64, that is, a liquid reservoir space, can be reduced. As illustrated in FIG. 6E, a protrusion 63c may be extended from an upper end of the inner cylindrical portion 63a and brought into contact with a part of the inner portion 64b of the elastic valve element 64. In other words, the clearance S1 has a fan shape in plan view. This enables the elastic valve element 64 to be supported by the protrusion 63c. As described above, the shape of each of the clearances S1 and S2 is not particularly limited. When the clearances S1 and S2 are each formed in an annular shape, or a plurality of the raised portions 63b and the protrusions 63c are annularly provided at regular intervals, passages can be uniformly and radially provided to enable contents to stably flow.

The nozzle member 61 is also configured to cause the elastic valve element 64 to deform in two stages to open for contents from the container. The squeeze container 60 has a check valve structure 15 that includes the inner flange 43a and the inner cylindrical portion 63a (valve seat) of the valve seat body 63 on an upstream side, the downstream support portion 35 (support portion) of the upper bottom portion 22 of the nozzle plug 62 on a downstream side, and the elastic valve element 64 fixed therebetween. In an unloaded state, an inner surface of the outer edge portion of the elastic valve element 64 is annularly and elastically in contact with an outer surface of the inner cylindrical portion 63a, and a passage between the inner flange 43a and the downstream support portion 35 is closed by the elastic valve element 64 (closed state).

That is, the inner portion 64b first elastically deforms downstream (first deformation) for contents from the container while the closed state is maintained. Next, as pressure of the contents from the container increases, the inner portion 64b of the elastic valve element 64 elastically deforms greatly, and the outer edge portion 64a is inclined accordingly, or a part of the outer edge portion is radially expanded (second deformation) (refer to FIG. 6C). This reduces an engaging force (fitting force) between the inner surface of the outer edge portion 64a of the elastic valve element 64 and the inner cylindrical portion 63a of the valve seat body 63 to release the seal with the elastic valve element 64. Then, the contents are supplied to the nozzle 23 (refer to the arrow in FIG. 6C) through the clearance S1 at the upper portion of the inner cylindrical portion 63a, a space between the inner surface of the outer edge portion 64a of the elastic valve element 64 and the inner cylindrical portion 63a of the valve seat body 63, the clearance S2 below the outer edge portion, and the passage (recessed portion 38). Similarly to another nozzle member, the nozzle member 61 can prevent a substance from being sucked from the outside air by the effect of the check valve structure, and prevent liquid from remaining near the opening of the nozzle 23 due to returning of the inner portion 64b to the original shape, after use.

Any one of cases of FIGS. 6A, 6D, and 6E also enables the inner portion 64b of the elastic valve element 64 to be curved so as to project upstream like the inner portion 18b of the elastic valve element 18 in FIG. 2. As a result, the amount of liquid to be drawn back can be increased.

Figure 7A:
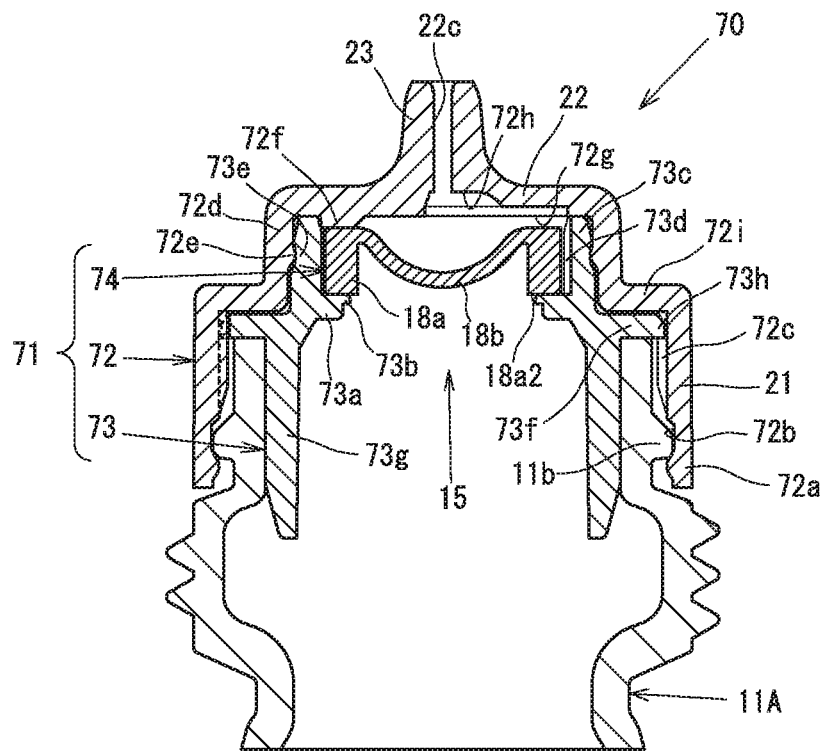
FIG. 7A is a side sectional view illustrating yet another embodiment of the nozzle member of the squeeze container of the present invention.

FIG. 7A illustrates a squeeze container 70 that includes a container 11A substantially similar to the squeeze container 10 of FIG. 1, and a nozzle member 71 attached to an opening of the container 11A.

The nozzle member 71 includes a cylindrical nozzle plug 72 fixed to the opening of the container 11A, a cylindrical valve seat body 73 inserted into the nozzle plug 72, and an elastic valve element 74 housed in the valve seat body 73 while being supported between the nozzle plug 72 and the valve seat body 73.

Unlike the nozzle plugs 16, 32, 42, 52, 62 in FIGS. 1 to 6, the nozzle plug 72 includes a nozzle base 21 with a lower portion increased in diameter to be fitted over the opening of the container 11A. Thus, the nozzle plug 72 has a stepped shape as viewed from its side face. A lower stepped portion 72a is provided in its inner peripheral surface with an engaging groove 72b. The engaging groove 72b is engaged with an engaging piece 11b provided on an outer peripheral surface of the opening of the container 11A to fix the nozzle plug 72 to the opening of the container 11A.

The lower stepped portion 72a is also provided on its inner peripheral surface with a plurality of vertical ribs 72c at regular intervals above the engaging groove 72b. The vertical rib 72c is engaged with a tip projection 73h of an outer flange 73f of the valve seat body 73, described later, to suppress relative rotation between the nozzle plug 72 and the valve seat body 73. Besides engagement, adhesion, welding, or the like may be used as a method for suppressing relative rotation.

An upper stepped portion 72d is provided on its inner surface with a protrusion 72e. The protrusion 72e is fitted into a recess 73e of the valve seat body 73, described later, to couple the nozzle plug 72 and the valve seat body 73 to each other.

Figure 7B:
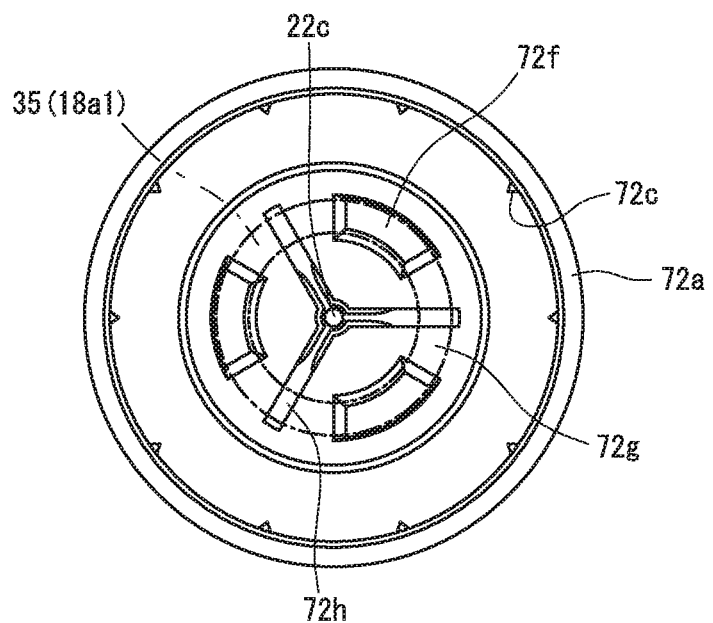
FIG. 7B is a bottom view of a nozzle plug.

An upper bottom portion 22 is provided on its lower surface with projecting portions 72f which are provided at regular intervals so as to surround a center hole 22c. The nozzle plug 72 is not provided with an expanded portion 37 as illustrated in FIG. 4B or 5B, and recessed portions (communication passage) 72g are provided between the corresponding projecting portions 72f. The imaginary lines in FIG. 7B show an annular downstream support portion 35 that supports the elastic valve element 74 and is brought into contact with a downstream end surface 18a1.

The recessed portion 72g of the nozzle plug 72 is provided with at least one narrow groove 72h extending radially outward from the center hole 22c to prevent contents flowing toward the center hole 22c(nozzle 23) from being significantly blocked by the elastic valve element 74. Specifically, three narrow grooves 72h are provided radially outward (radially) from the center hole 22c toward spaces between the corresponding projecting portions 72f. The narrow groove 72h is provided with a radially outward end extending outward from an outer edge portion 18a of the elastic valve element 74. Then, the narrow groove 72h constitutes a part of the communication passage. The narrow groove 72h has a depth increasing toward the center hole 22c. The depth may be constant.

Similarly to the valve seat body 43 illustrated in FIG. 5, the valve seat body 73 is provided on its inner peripheral surface with an inner flange 73a. The inner flange 73a has an upper surface serving as an upstream support portion that is brought into contact with an upstream end surface 18a2 of the elastic valve element 74.

The inner flange 73a is provided at its inner peripheral end with a projecting portion 73b extending inward so as to increase an area of the upstream support portion, as illustrated in FIG. 7A. The projecting portion 73b may not be provided.

At least one vertical groove 73d is provided in an inner peripheral surface of an upper cylindrical portion 73c above the inner flange 73a. The vertical groove 73d is configured to prevent the entire outer peripheral surface of the outer edge portion 18a of the elastic valve element 74 from being brought into contact with the inner peripheral surface of the upper cylindrical portion 73c to prevent contents flowing toward the center hole 22c from being blocked by the elastic valve element 74. In other words, the vertical groove 73d is configured to secure a passage of the contents. It is preferable to provide a plurality of vertical grooves 73d at regular intervals. As described above, the recess 73e is provided in the outer peripheral surface of the upper cylindrical portion 73c, and is engaged with the protrusion 72e provided on the inner peripheral surface of the upper stepped portion 72d of the nozzle plug 72.

The outer flange 73f projecting radially outward is provided below the upper cylindrical portion 73c. The outer flange 73f is provided at its outer peripheral end with the tip projection 73h that is engaged with the vertical rib 72c of the nozzle plug 72 as described above. The outer flange 73f has a lower surface that is in contact with a leading end surface (upper end surface) of the opening of the container 11A. This prevents the valve seat body 73 from being displaced upstream (inside of the container 11A) to enable the elastic valve element 74 to be supported (held) with a stable force between the valve seat body 73 and the downstream support portion 35 of the nozzle plug 72. Downstream movement of the valve seat body 73 is regulated by a horizontal portion (expanded stepped portion) 72i between the lower stepped portion 72a and the upper stepped portion 72d of the nozzle plug 72, and the upper bottom portion 22.

An outer peripheral surface of a lower cylindrical portion 73g below the outer flange 73f is in close contact with the inner peripheral surface of the opening of the container 11A to prevent leakage of the contents from this portion.

The elastic valve element 74 has the outer edge portion 18a with a height (thickness) higher (thicker) than that of other portions thereof to enhance sealability in an unloaded state, similarly to the elastic valve element 44 of FIGS. 5A and 5C. A thin inner portion 18b provided so as to form a film on an upper portion of the cylindrical outer edge portion 18a is curved so as to project upstream in an unloaded state, similarly to the inner portion 18b illustrated in each of FIGS. 1 to 3.

Similarly to the squeeze container 40 of FIG. 5A, the nozzle member 71 also includes a check valve structure 15 in which the upstream end surface 18a2 of the outer edge portion 18a of the elastic valve element 74 and the upstream support portion (the upper face of the inner flange 73a) of the valve seat body 73 are annularly brought into contact with each other to close the communication passage. The elastic valve element 74 opens for contents from the container 11A by deforming in two stages (first deformation in which only the inner portion 18b deforms downstream, and second deformation in which the outer edge portion 18a deforms). Thus, the valve does not unnecessarily open. The nozzle member 71 can also prevent liquid from remaining near the opening of the nozzle 23 due to returning of the inner portion 18b to the original shape, after use. Other structures are substantially the same as those of the squeeze container 40 of FIG. 5.

REFERENCE SIGNS LIST 10 squeeze container
11, 11A container
11a nozzle coupling portion
11b engaging piece
12 nozzle member
15 check valve structure
16 nozzle plug
17 valve seat body
17a support projection (upstream support portion)
17b valve seat coupled portion
18 elastic valve element
18a outer edge portion
18a1 downstream end surface
18a2 upstream end surface
18b inner portion
18c stepped portion
21 nozzle base
21a lower end of nozzle base
22 upper bottom portion
22c center hole
23 nozzle
24 downstream support portion
24a projecting portion
24b recessed portion
30 squeeze container
31 nozzle member
32 nozzle plug
33 valve seat body
33a upper end surface (upstream support portion)
34 elastic valve element
35 downstream support portion
36 projecting portion
36a outer protrusion
36b inner protrusion
37 expanded portion
38 recessed portion
40 squeeze container
40a squeeze container
41 nozzle member
42 nozzle plug
42a outer groove
42b inner surface of nozzle tip
43 valve seat body
43a inner flange
44 elastic valve element
50 squeeze container
51 nozzle member
52 nozzle plug
52a outer groove
53 valve seat body
54 elastic valve element
54a notch
60 squeeze container
61 nozzle member
62 nozzle plug
63 valve seat body
63a inner cylindrical portion
63b raised portion
63c protrusion
64 elastic valve element
64a outer edge portion
64b inner portion
70 squeeze container
71 nozzle member
72 nozzle plug 72a lower stepped portion
72b engaging groove
72c vertical rib
72d upper stepped portion
72e protrusion
72f projecting portion
72g recessed portion
72h narrow groove
72i expanded stepped portion
73 valve seat body
73a inner flange
73b projecting portion
73c upper cylindrical portion
73d vertical groove
73e recess
73f outer flange
73g lower cylindrical portion
73h tip projection
74 elastic valve element

The invention claimed is:

1. A check valve structure that allows fluid to flow from one side to another side of the check valve structure, the check valve structure comprising:
an annular valve seat;
an annular support portion;
an elastic valve element fixed between the valve seat and the support portion, wherein the valve seat is disposed upstream of the elastic valve element, wherein the support portion is disposed downstream of the elastic valve element, wherein the elastic valve element has an annular outer edge portion and an inner portion surrounded by the outer edge portion, wherein the outer edge portion includes a first surface and a second surface opposite the first surface; and
a passage extending between the first surface and the second surface through an outermost perimeter of the outer edge portion of the elastic valve element, wherein:
the passage switches between a closed state and an open state,
the passage is in the closed state when (1) a first portion of the first surface of the outer edge portion of the elastic valve element is in contact with the support portion and a second portion of the first surface of the outer edge portion of the elastic valve element is not in contact with the support portion and (2) an entire circumferential length of the second surface of the outer edge portion of the elastic valve element is in contact with the valve seat,
the passage is in the open state when (1) the first portion of the first surface of the outer edge portion of the elastic valve element is in contact with the support portion and the second portion of the first surface of the outer edge portion of the elastic valve element is not in contact with the support portion and (2) a third portion of the entire circumferential length of the second surface of the outer edge portion of the elastic valve element is not in contact with the valve seat to allow the passage to communicate from the third portion on the second surface through the outermost perimeter to the second portion on the first surface of the outer edge portion of the elastic valve element,
wherein when first pressure of fluid is applied to the elastic valve element from the downstream, the passage is in the closed state,
wherein when second pressure of fluid is applied to the elastic valve element from the upstream, (1) the passage is in the closed state and (2) the inner portion of the elastic valve element deforms toward the downstream, and
wherein when third pressure of fluid is applied to the elastic valve element from the upstream, (1) the passage is in the open state and (2) the outer edge portion of the elastic valve element elastically deforms such that the third portion of the entire circumferential length of the second surface of the outer edge portion of the elastic valve element is not in contact with the valve seat allowing the passage to extend from the third portion on the second surface through the outermost perimeter to the second portion on the first surface of the outer edge portion of the elastic valve element.

2. The check valve structure according to claim 1, wherein a recessed portion is disposed between the support portion and the second portion on the first surface of the outer edge portion of the elastic valve element such that the passage communicates from the recessed portion through the outermost perimeter to the second portion on the first surface of the outer edge portion of the elastic valve element when the passage is in the open state.

3. The check valve structure according to claim 1, wherein a notch is disposed at the second portion of the first surface of the outer edge portion of the elastic valve element such that the passage communicates from the notch through the outermost perimeter to the second portion on the first surface of the outer edge portion of the elastic valve element when the passage is in the open state.

4. The check valve structure according to claim 1, further comprising
a plurality of the passages annularly provided on the outermost perimeter of the elastic valve element at regular intervals.

5. The check valve structure according to claim 1, wherein the valve seat includes an opening for accommodating the inner portion of the elastic valve element.

6. The check valve structure according to claim 1, wherein at least a part of the outer edge portion is thicker than the inner portion.

7. The check valve structure according to claim 1, wherein at least a part of the outer edge portion of the elastic valve element is thicker than the inner portion, and
the valve seat includes an annular inner flange formed on an inner surface of the valve seat.

8. The check valve structure according to claim 1, wherein the elastic valve element has a first cylindrical body such that the outer edge portion of the elastic valve element protrudes from the elastic valve element towards the upstream,
the valve seat has a second cylindrical body and includes a flange portion extending from an inner surface of the valve seat toward an axis of the second cylindrical body of the valve seat, and an inner cylindrical portion extending toward the downstream from a part of the flange portion that is closest to the axis of the second cylindrical body of the valve seat, and
when the elastic valve element and the valve seat are assembled, an inner surface of the first cylindrical body of the elastic valve element is in contact with an outer surface of the inner cylindrical portion of the valve seat.

9. The check valve structure according to claim 8, wherein
a clearance is provided between an upstream surface of the inner portion of the elastic valve element and a downstream surface of the inner cylindrical portion of the valve seat, and
a clearance is provided between the second surface of the outer edge portion of the elastic valve element and a downstream surface of the flange portion of the valve seat.

10. The check valve structure according to claim 1, wherein
at least a part of the inner portion is thinner than the outer edge portion of the elastic valve element.

11. The check valve structure according to claim 10, wherein
the inner portion is curved so as to project upstream.

12. A nozzle member attached to an opening of a flexible container, the nozzle member comprising:
the check valve structure according to claim 1; and
a nozzle provided downstream of the support portion of the check valve structure.

13. The nozzle member according to claim 12, comprising:
a cylindrical nozzle plug;
a cylindrical valve seat body inserted into the nozzle plug; and
the elastic valve element fixed between the nozzle plug and the valve seat body,
wherein the nozzle plug is provided with the support portion and the nozzle, and
the valve seat body is provided with the valve seat.

14. The nozzle member according to claim 12, wherein the nozzle is a droplet nozzle.

15. A squeeze container comprising:
a container with flexibility; and
the nozzle member according to claim 12.

16. A squeeze container comprising:
a container having flexibility and including a nozzle; and
the check valve structure according to claim 1.

17. The squeeze container according to claim 16, wherein the nozzle is a droplet nozzle.

* * * * *